June 5, 1956  J. H. CANNING  2,749,511
ELECTRICAL TESTER
Filed Nov. 14, 1950

INVENTOR
JAMES H. CANNING
BY
Paul S. Martin
ATTORNEY 2,749,511
Patented June 5, 1956

2,749,511
ELECTRICAL TESTER

James H. Canning, Williamsport, Pa., assignor to Sylvania Electric Products Inc., a corporation of Massachusetts Application November 14, 1950, Serial No. 195,659

7 Claims. (Cl. 324—62)

This invention relates to improvements in electrical testing and measuring devices and more particularly to apparatus for detecting short circuits and inter-electrode leakage resistances in vacuum tubes and the like.

Although the invention is broadly applicable to many uses in the electrical field, it has been adapted to thermionic vacuum tube measurements and the following description is particularly directed to the embodiment for this use.

Among the many tests which are applied to thermionic vacuum tubes at the time of their manufacture and later during the course of their useful lives are measurements for interelectrode leakage resistances and the detection of internal short circuits. In testing vacuum tubes it is necessary to know the order of the interelectrode leakage resistance across mica spacers, for example, and it has been determined that in many types of tubes a resistance as low as 250,000 ohms can be tolerated. Other types of tubes such as high mu pentodes require a higher value of leakage resistance. Low gain triodes on the other hand have a higher tolerance to lower leakage resistance. It is desirable therefore that any indicating device should be adaptable to all types of tubes without changes in the test circuit. In the case of short circuits, it is of importance to note whether a pure short circuit exists, or whether there is a low resistance short.

A number of devices are known in the art which have the ability to detect and indicate these characteristics. All of these devices, however, have characteristic limitations. This invention avoids limitations of previous methods and arrangements for making these tests.

For example, a known circuit for testing vacuum tubes for interelectrode shorts and leakage resistance utilizes a neon tube as an indicator. When the terminals of a vacuum tube whose leakage resistance is to be checked are connected to the terminals of such a device, a short circuit is indicated by a continuous steady glow of the indicating lamp. If, on the other hand, the insulation between the elements being tested is of a proper quality, it is intended that the lamp should not glow. This indicates the desirable condition for the test. The critical value of leakage resistance, such as a value of 250,000 ohms would theoretically be indicated by a positive glow from the lamp.

The value of resistance indicated by a glow lamp depends heavily on the subjective reaction of the observer, and the glow lamp itself varies at different times and under different prevailing voltages.

A second type of measuring device frequently used for measuring leakage and shorts in thermionic vacuum tubes is the ohmmeter. The simpler types of ohmmeters contain merely an electric meter movement, a source of electrical energy, and a switchable series of impedances which permit the alteration of the meter range to suit the magnitude of impedance of the test circuit. Usual ohmmeter circuits have characteristics such that the resistance readings are crowded at the lower end of the range or at the upper end of the range but not compressed at both ends. In contrast, with the present invention, useful indications of both very low and very high resistances can be had and, at the same time, expansion of the scale for resistances of intermediate values is attained.

A further feature of the present invention is that the readings on the meter, left to right, are in the direction of increasing value of resistance to accord with the customary direction of increasing values in current and voltage indicators.

With the disclosed embodiments of the invention, continuous readings of vacuum tube interelectrode resistances over a range are obtained which include the short-circuit condition and high resistance conditions, permitting use for many different types of tubes. The circuit may be adjusted and calibrated with considerable accuracy. Where a meter of standard damping is used, it is possible to observe flicker shorts between tube elements by noting needle movement.

The circuit will show a resistance up into the megohm region with the values well spread along the meter scale, while a resistance of several thousand ohms will not show up as a dead short, but will be definitely observable.

The embodiments of the invention have the further features of high sensitivity, capacity to operate with alternating current or with direct current, and the foregoing results are achieved without complexity and without requiring critical components. In the illustrative embodiments of the invention described in detail below, a form of bridge circuit is shown containing an electron discharge device or the like in a suitable network that takes advantage of a non-linear characteristic of the device to realize the foregoing desirable characteristics.

Figure 1:
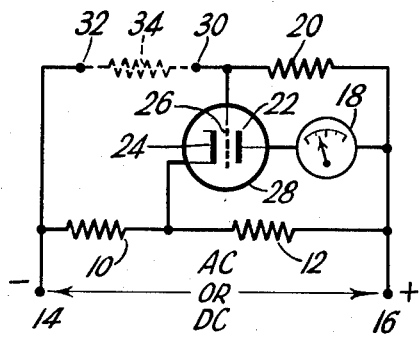
Fig. 1 is a wiring diagram of one illustrative embodiment of the invention.

In Fig. 1, the impedances or resistors 10 and 12 are series connected, and are arranged as a voltage divider connected to the electrical alternating current or direct current supply terminals 14 and 16. Attached to one end of this voltage divider at terminal 16, are the grid-dropping impedance or resistor 20 and the meter 18 is of the conventional moving-coil type having an indicating pointer proportionally responsive to the current through the coil. Alternating current or direct current can be used, with appropriate impedances; but resistors can be used for both forms of energization where resistance is to be measured.

Connected to the other terminal of the current measuring device 18 is the anode 22 of a triode vacuum tube 28, or like translating device. Cathode 24 of vacuum tube 28 is connected to the junction or tap between resistors 10 and 12 in the voltage divider. Attached to control electrode 26 of vacuum tube 28 is the remaining end of resistor 20. Also provided at the junction of control grid 26 and resistor 20 is a terminal 30 or test lead, or other connecting means for the device to be tested. A second connection to the device to be tested is made through a terminal 32 or suitable test lead or the like which is connected to the junction of resistor 10 and electrical supply terminal 14. Cathodes of the indirectly heated or directly heated type can be used, with suitable energizing connections not shown. In the drawing, the device 34 to be tested is shown in dotted lines as a resistance. It should be further understood that in lieu of resistors 10, 12, 20 and 34, other forms of impedance can be substituted.

The operation of the circuit of Fig. 1 is as follows: Resistances 10 and 12 form a voltage dividing network in parallel with a similar branch containing unknown resistor 34 and resistance 20. If it is assumed that the ratio of resistor 10 to resistor 12 is equal to the ratio of resistor 34 to 20, it is apparent that with voltage applied to the parallel branches of the circuit, there will be no potential difference between the point 30 and the junction of resistors 10 and 12. If then, the cathode 24 and the grid 26 of vacuum tube 28 are at the same potential, a certain amount of zero bias current will flow between the cathode 24 and the anode 22 due to the potential difference at the junction of resistors 10 and 12, and the supply point 16. This current would flow through a path from the supply point 16 through the meter 18, through the tube 28, through the resistor 10, returning to the source through terminal 14 and would be of a quantity determined by the size of the resistance in the circuit and the resistance of the vacuum tube at zero bias. Now if resistor 34 has a value which destroys the balance of the arms of the circuit, it is apparent that the potential appearing on grid 26 as a result of the voltage dividing action of the unknown impedance 34 and resistor 20 will vary. If the unknown 34 has a resistance equivalent to a short-circuit, the grid 26 will assume the potential of the supply terminal 14 and being depressed below the potential of cathode 24, will reduce or cut off the flow of electrons through the vacuum tube 28. By selecting the proper type of vacuum tube characteristic for the circuit the circuit is readily arranged for a cut-off condition of the tube 28 to occur when a short-circuit is inserted as unknown 34. On the other hand, if the unknown 34 is removed from the circuit, leaving the test terminals 30 and 32 open circuited, the grid 26 will rise to a potential barely equal to that of the anode 22 and the tube will become nearly fully conductive. A current limited by the size of resistor 10, by the internal resistance of the tube 28, and the resistance of the meter 18 will then flow. Little current will flow through the grid circuit due to resistor 20 which can be chosen of a sufficiently high, current-limiting value. The characteristic of the tube 28, the meter 18, and the impedance 10, are selected to limit the current flowing through the meter 18 to the maximum meter scale deflection required.

As will be seen from Fig. 1, either a direct current or an alternating current source can be employed. Regardless of which type of current source is used, the meter 18 can be of a direct current type. In the alternating current case, the current in the anode branch of the circuit is self rectifying because of the unilaterally conductive nature of the vacuum tube 28. There need be no more than minor change in circuit values for either type of current, where the network uses resistors as shown. It should also be noted that any device whose conductivity can be varied by means of an imposed control voltage and which has a suitable non-linear control-conductivity characteristic can be substituted for the triode vacuum tube 28 shown.

From the foregoing description it is apparent that the circuit derives its special characteristics from the combination of the unbalanced potentiometer circuit operating in conjunction with the characteristic curve of the vacuum tube or other conductive selected. Depending upon the application, vacuum tubes having more than one grid and remote or sharp cutoff characteristics can be employed. By proper selection of the tube operating characteristic, it is possible to shift the expanded portion of the resistance scale higher or lower, so that tubes having critical minimum leakage resistances in the neighborhood of, for example, .75 megohms can be read at center scale.

Figure 2:
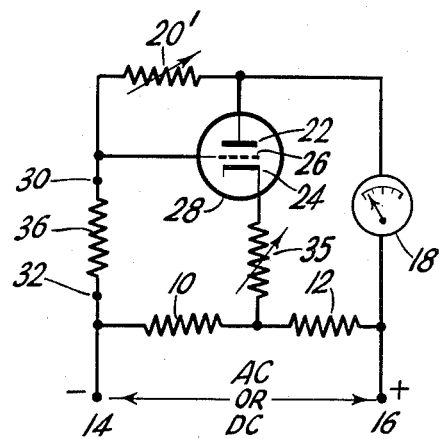
Fig. 2 is a wiring diagram of a modification, arranged for calibration.

Fig. 2 illustrates a modification of the circuit of Fig. 1 in a more flexible form. It is arranged with elements for meter calibration. The circuit is in most respects identical to that of Fig. 1, except for the changes made which are described below.

Meter 18 has been relocated so that it is now connected between the junction of resistor 20', the anode 22 of the vacuum tube 28, and supply terminal 16. This change is dictated by exigencies of the tube tester in which this circuit is used; the slight alternating current through this meter to resistor 20' does not affect the meter readings. The resistor 20' has been made variable to permit easy calibration of the meter 18. The relative proportion of resistors 36 and 20' to resistors 10 and 12 remains the same as described previously. Because of the comparative freedom of choice of size of impedances of resistances within the proportions set for the above, the current through meter 18 contributed by the resistors 20 and 36 may be kept very small—so small in fact, that the contribution to the current read by the meter will be negligible, regardless of whether alternating or direct current is used. The insertion of the variable resistor 35 in the cathode circuit of vacuum tube 28 permits ready adjustment of the bias on tube 28.

In operation, with the test resistor 36 removed from the circuit, and the terminals 30 and 32 open circuited, the variable cathode resistor 35 is set to give full deflection of the milliammeter. Resistor 35 and, to a lower extent, resistor 10 introduce negative potential on the grid so that the entire scale is adjusted when the full-scale reading is set.

Adjustment of the resistance 20' then permits variation of the circuit balance so that a selected resistance value will appear as mid-scale reading of the meter. If, for example, it is desired to make a test with the region of 250,000 ohms in the center of the meter scale, resistor 36 is given a 250,000 ohm value and resistor 20 is adjusted to give a mid-scale deflection of the meter. In the vacuum tube leakage resistance test application of the circuit, it might then be further convenient to mark the left hand side of the scale below 250,000 ohms "reject" and to mark the right hand side of the scale "good." Note that the current which flows through the meter 18 is limited by the circuit path through the internal resistance of the meter 18, the internal resistance of the vacuum tube 28, the variable cathode resistance 34 and resistor 10 of the voltage divider 10. This means that the meter is protected at all times from excess of current. The device under test is also protected, inasmuch as its current is always limited by the high impedance of resistance 20'.

Figure 3:
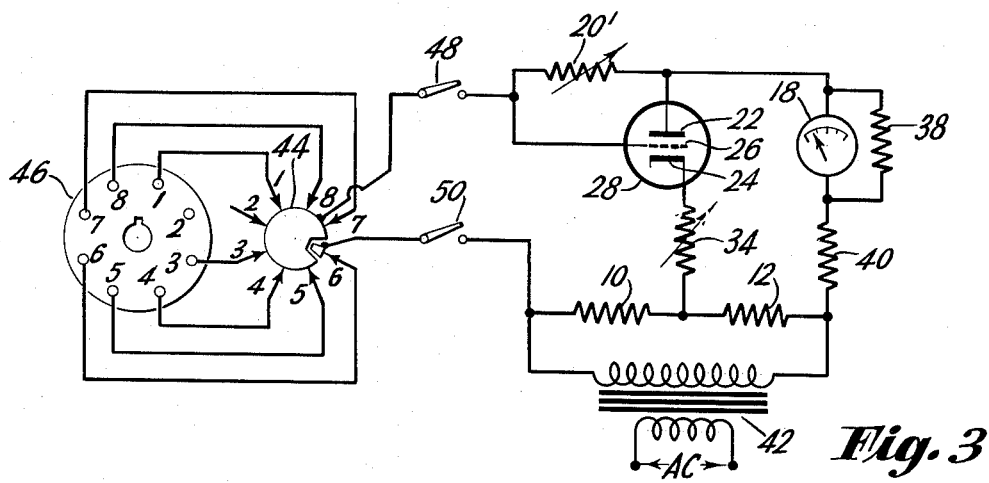
Fig. 3 is a wiring diagram of an embodiment applied to a tester for conventional vacuum tubes.

Fig. 3 shows the modified circuit of Fig. 2 modified further for use in a tube tester of otherwise conventional structure. Here, the circuit components remain the same except that additional resistances 38 and 40 have been provided in the meter arm of the conduit, and are shown to indicate the sort of modifications that may be necessary when the meter 18 is to be used in many other circuits where different calibrations may be required. In lieu of the current supply terminals 14 and 16 of Figs. 1 and 2, a transformer 42 is shown. It is obvious that a tapped transformer could also be used, in which case resistors 10 and 12 could be eliminated from the circuit. In place of the test terminals 30 and 32 of Figs. 1 and 2, switches 48 and 50 are shown, which may be inserted to increase the flexibility of application of the device. Attached to switches 48 and 50 are the tube socket 46 and the rotary selector switch 44, which represent a portion of the tube testing circuits of a standard type tube tester. In this arrangement, the switch 44 causes all of the elements connected to the pins of a tube placed in the socket 46 to be connected together, except for the element under test. For example, in the drawing, the switch 44 is set so that the element attached to pin 6 is being tested, and the remaining tube elements, 1, 3, 4, 5, 7 and 8 are all shorted together by the switch. In this manner, it is possible to determine immediately whether an individual element is shorted to any of the other elements. Terminal 2 is shown without circuit connection since it represents the second heater terminal of the tube in socket 46, which is connected through suitable switching (not shown) to a heater supply winding also connected to the other heater terminal. Obviously that heater winding is to be safeguarded against short-circuiting by switch 44. The details of that circuit are omitted since they form no part of the present invention.

Figure 4:
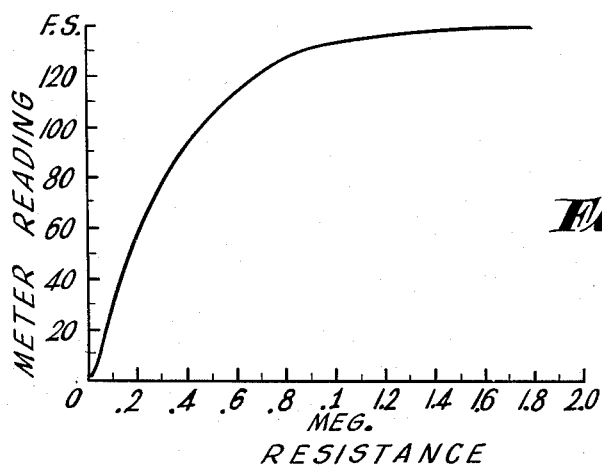
Fig. 4 is a typical curve representing resistance against meter deflection for a meter in the circuit of Figure 3.

In Fig. 4 is shown a typical curve obtained with this circuit which the meter deflection plotted against values of resistance. The compression effects produced at either end of the vacuum tube characteristic enables the instrument to give widely different readings in the intermediate region, and at the same time to remain sensitive to values at both extremes. As the measured resistance increases in value, the potential of grid 26 is raised above cut-off and current begins to flow. The initial rate of rise of current with respect to increasing resistance is a function of the remoteness of the cut-off of the vacuum tube 28. At a point near 100,000 ohms on the curve, the rate of current change with respect to resistance change has become nearly exponential, and it remains so through the region where the most accurate measurement is desired. As the grid reaches zero bias, the current nears its maximum value and the rate of increase tapers off rapidly to a maximum amount controlled by the resistance in the anode current path. This maximum current limit may occur at a test resistance value of approximately 1.8 megohms, as is in this embodiment.

Typical values used in the circuit of Fig. 3 to produce the curve of Fig. 4 are:

Resistance 10=10K
Resistance 12=100K
Resistance 20'=2 meg.
Resistance 35=30K
Vacuum tube 28=6C4

It will be recognized that the circuit arrangements described embody various novel aspects which do not necessarily depend upon the specific embodiments and that the invention will be found to have varied application. Consequently, it is appropriate that the appended claims be accorded such broad scope of interpretation as is consistent with the spirit of the invention.

What I claim is:

1. An impedance testing circuit including an electrical translator having two current-translating terminals and a current-control terminal, a voltage divider having energizing terminals and an intermediate tap, a circuit terminating at the ends of said voltage divider and having a reference impedance in series with means for connections to an impedance to be tested, means connecting one current-translating terminal of said translator to said intermediate tap, means connecting the other current-translating terminal of said translator to the junction of said reference impedance and said voltage divider, the control terminal of said translator being connected to the junction of said reference impedance and said impedance connecting means, and current measuring means in one of said connecting means.

2. An impedance testing circuit having a vacuum tube with a cathode, at least one control electrode, and an anode, a voltage divider having energizing terminals and an intermediate tap, a circuit terminating at the ends of said voltage divider and having a reference impedance in series with connecting means for an impedance to be tested, means for connecting said cathode to said intermediate tap, said control electrode being connected to the junction of said reference impedance and said impedance connecting means, means connecting said anode to the junction of said reference impedance and said voltage divider, and means for measuring current in a current path connecting said voltage divider to said vacuum tube.

3. An impedance testing circuit having an electron discharge device with a cathode, at least one control electrode and an anode, a voltage divider having energizing means and an intermediate tap, a circuit terminating at the ends of said voltage divider and having an adjustable reference impedance in series with means for connecting an impedance to be tested, means constituting a current path from said cathode to said intermediate tap and including means for applying bias potential to said cathode, a connection from said anode to the junction of said reference impedance and said voltage divider, a control electrode in said discharge device being connected to the junction of said reference impedance and said impedance connecting means, and a current meter in the anode current path of said discharge device.

4. A resistance testing circuit having a vacuum tube with an anode, a cathode, and at least one grid, a voltage divider having an intermediate tap and first and second terminals for receiving electrical energy, a reference resistance connected between said first terminal and said one grid, connecting means at said grid and said second terminal for the resistive device to be tested, an adjustable degenerative resistor in a circuit between said vacuum tube and said intermediate tap, a circuit between said anode and said first terminal, and a current meter in a circuit to said vacuum tube.

5. In a resistance test circuit, a network having parallel branches and a variable conductivity device having an electron source, a control electrode, and an anode and having a continuous non-linear characteristic, one of said branches having a voltage divider with an intermediate tap and first and second terminals for receiving electric energy, another of said branches having a reference resistor and two terminals for connecting a resistance to be measured in series with said reference resistor, said reference resistor having a connection to said first terminal, a current path from said electron source to said intermediate tap including means for varying the conductivity of said device, a connection from said control electrode to the function of said reference impedance and said measured impedance terminal, a connection from said anode to said first terminal and a current measuring device in a connection between said first energy receiving terminal and said anode.

6. An impedance testing circuit comprising an electron discharge device having a cathode, a control electrode and an anode, a voltage divider having first and second energizing terminals and an intermediate tap, means connecting said first energizing terminal to said anode to provide anode potential, a first adjustable impedance in circuit between said control electrode and said anode, input means having a first connection to said control electrode and a second connection to said second energizing terminal for connecting an impedance to be tested in circuit between said control electrode and said cathode, a second adjustable impedance in circuit between said cathode and said intermediate tap, and means for measuring current in a path between said first energizing terminal and said anode.

7. An impedance testing circuit comprising an electron discharge device having a cathode, a control electrode and an anode, a voltage divider having first and second energizing terminals and an intermediate tap, means connecting said first energizing terminal to said anode to provide anode operating potential, a first adjustable resistance in circuit between said control electrode and said anode, input means having a first connection to said control electrode and a second connection to said second energizing terminal for connecting a resistive device to be tested in circuit between said control electrode and said cathode, a second adjustable resistance in circuit between said cathode and said intermediate tap, and means for measuring current in a path between said first energizing terminal and said anode.

References Cited in the file of this patent

UNITED STATES PATENTS 2,033,465    Graham _____ Mar. 10, 1936

(Other references on following page)

UNITED STATES PATENTS

| | | |
|---|---|---|
| 2,339,579 | Milne | Jan. 18, 1944 |
| 2,468,791 | Thomson | May 3, 1949 |
| 2,490,965 | Huck | Dec. 13, 1949 |
| 2,492,733 | Burchell | Dec. 27, 1949 |
| 2,510,691 | Gilbert | June 6, 1950 |
| 2,527,753 | McConnell | Oct. 31, 1950 |
| 2,566,367 | Peters | Sept. 4, 1951 |
| 2,621,239 | Cade et al. | Dec. 9, 1952 |
| 2,680,186 | Pridmore et al. | June 1, 1954 |

FOREIGN PATENTS

| | | |
|---|---|---|
| 398,985 | Germany | July 16, 1924 |
| 452,175 | Germany | Nov. 7, 1927 |
| 722,774 | Germany | July 20, 1942 |
| 422,013 | Great Britain | Jan. 3, 1935 |
| 436,923 | Great Britain | Oct. 21, 1935 |

OTHER REFERENCES

"Electronic Megohmmeters," by Spratt, Wireless World, October 1948, pages 354–357.